United States Patent [19]  
Song

[11] 4,086,410  
[45] Apr. 25, 1978

[54] THERMOPLASTIC MOLDING COMPOSITION COMPRISING A TERPOLYMER OF α-METHYLSTYRENE, METHYL METHACRYLATE AND N-VINYL-2-PYRROLIDONE

[75] Inventor: Il H. Song, Lombard, Ill.

[73] Assignee: The Richardson Company, Des Plaines, Ill.

[21] Appl. No.: 684,792

[22] Filed: May 10, 1976

[51] Int. Cl.$^2$ ............................................. C08F 26/10
[52] U.S. Cl. ................................. 526/264; 526/329.2; 526/347
[58] Field of Search ................................ 526/264, 329

[56] References Cited

U.S. PATENT DOCUMENTS

| 2,882,262 | 4/1959 | Smith et al. | 526/329 |
| 2,938,017 | 5/1960 | Grosser | 526/264 |
| 3,072,622 | 1/1963 | Ham | 526/329 |
| 3,135,723 | 6/1964 | Vandegaer | 526/329 |

Primary Examiner—Harry Wong, Jr.
Attorney, Agent, or Firm—Alan M. Abrams

[57] ABSTRACT

A thermoplastic molding composition comprising a terpolymer having a weight ratio of from about 20 to 50, preferably 20 to 30, parts α-methylstyrene, about 79 to 40, preferably 73 to 67, parts methyl methacrylate and about 1 to 10, preferably 3 to 6, parts N-vinyl-2-pyrrolidone. A particularly preferred terpolymer composition includes 25 parts α-methylstyrene, 70 parts methyl methacrylate and 5 parts N-vinyl-2-pyrrolidone. Thermoplastic molding compositions embodying this invention are characterized by excellent transparency, high flow rates and resistance to deformation at high temperatures.

6 Claims, No Drawings

THERMOPLASTIC MOLDING COMPOSITION COMPRISING A TERPOLYMER OF α-METHYLSTYRENE, METHYL METHACRYLATE AND N-VINYL-2-PYRROLIDONE

BACKGROUND AND DESCRIPTION OF THE INVENTION

The present invention generally relates to thermoplastic molding compositions and, more particularly, to thermoplastic molding compositions comprising terpolymers of α-methylstyrene, methyl methacrylate and N-vinyl-2-pyrrolidone which are especially suited for use in injection molding.

Copolymers of α-methylstyrene and methyl methacrylate, made by known polymerization techniques, have been used to provide resins having relatively high heat distortion properties but which are characterized by relatively poor melt flow characteristics. As a result, processing such as, for example, injection molding, of these copolymer materials requires relatively high temperatures and presents other difficulties making their use in such operations less than fully satisfactory.

Efforts to overcome the foregoing disadvantages have involved copolymerizing minor amounts of alkyl acrylates, long chain alkyl methacrylates, vinyl stearate or vinyl propionate in molding compositions containing these copolymers to improve the flow rate. These comonomers, however, greatly reduce the heat distortion temperature of these α-methylstyrene and methyl methacrylate copolymers.

In accordance with an important aspect of the present invention, it has been found that terpolymers having a weight ratio from about 20 to 50 parts of α-methylstyrene, about 79 to 40 parts methyl methacrylate, and about 1 to 10 parts N-vinyl-2-pyrrolidone provide molding compositions which overcome the disadvantages of the prior art α-methylstyrene and methyl methacrylate copolymer molding compositions. In particular, the terpolymer molding compositions of the present invention have high heat resistance (i.e. they possess high heat deflection temperatures) and are also characterized by improved melt flow rate and transparency. As such, the improved terpolymer thermoplastic molding compositions of the present invention find particularly advantageous utility as injection molding compositions.

It is, therefore, an object of the present invention to provide a terpolymer composition characterized by improved transparency, melt flow and heat deflection properties.

Another object of the present invention is to provide an improved thermoplastic molding composition which is especially suited for injection molding operations.

Still another object of the present invention is to provide an improved molding composition comprising a terpolymer of α-methylstyrene, methyl methacrylate and N-vinyl-2-pyrrolidone which composition is characterized by high heat resistance as well as improved melt flow rates and transparency when compared to prior art thermoplastic molding compositions based on copolymers of α-methylstyrene and methyl methacrylate.

These and other objects of the present invention will be apparent from the following further detailed description thereof.

The terpolymer compositions of the present invention can be produced by employing known polymerization processes with monomer mixtures of α-methylstyrene, methyl methacrylate and N-vinyl-2-pyrrolidone. These monomer mixtures are combined in amounts which, when reacted at polymerization conditions, produce a terpolymer having a weight ratio of from about 20 to 50 parts α-methylstyrene, about 79 to 40 parts methyl methacrylate, and about 1 to 10 parts N-vinyl-2-pyrrolidone. Preferably, the terpolymer compositions of the present invention have from 20 to 30 parts α-methylstyrene, 73 to 67 parts methyl methacrylate and 3 to 6 parts N-vinyl-2-pyrrolidone. Particularly preferred terpolymer compositions of the present invention have about 25 parts α-methylstyrene, 70 parts methyl methacrylate and 5 parts N-vinyl-2-pyrrolidone.

In accordance with an important aspect of the present invention, it has been found that the addition of N-vinyl-2-pyrrolidone to α-methylstyrene/methyl methacrylate copolymers provides a resultant terpolymer reaction product characterized by a substantially increased melt flow rate and a high heat distortion temperature enabling such terpolymer compositions to be highly suited for molding at relatively low temperatures. Accordingly, an important aspect of the present invention concerns the discovery that the addition of controlled amounts of N-vinyl-2-pyrrolidone as a monomer reactant with α-methylstyrene and methyl methacrylate results in the production of thermoplastic molding compositions having excellent clarity and improved melt flow rates together with high heat distortion temperatures when compared to conventional α-methylstyrene/methyl methacrylate copolymer compositions. For example, a particularly preferred embodiment of the present invention is represented by a terpolymer containing 25 parts α-methylstyrene, 70 parts methyl methacrylate, and 5 parts N-vinyl-2-pyrrolidone which terpolymer is characterized by substantially improved melt flow rates (i.e. melt flows of 1.50 and 8.37 for 1.2 kg. and 3.8 kg. loads at 230° C., respectively, determined and measured in accordance with ASTM Method D-1238) together with a substantially increased heat distortion temperature (i.e. a heat distortion temperature of 275° F. under 264 psi, measured in accordance with ASTM D-648 procedure).

The following example illustrates a preferred embodiment of the present invention. In this example, the haze values were determined and are reported in accordance with ASTM Method D-1003 and the values presented for the haze are percentage values. Melt flow properties of the thermoplastic terpolymer molding composition were determined and are reported in accordance with ASTM Method D-1238. The melt flow measurements were performed at 230° C. using 1.2 and 3.8 kg, loadings. The reported values are for ten minute melt flow testing periods and are reported in grams. The heat deflection temperatures were determined using ASTM Method D-648 (1972) on specimens annealed for 16 hours at 105° C. The reported temperatures were obtained at 264 psi loadings.

In a two liter resin kettle equipped with a stirrer, a thermometer and a nitrogen inlet tube there were placed 1200 grams of deionized water, 4 grams of sodium dodecylbenzene sulfonate (Siponate DS-10), 100 grams of α-methylstyrene, 280 grams of methyl methacrylate, 20 grams of N-vinyl-2-pyrrolidone, 4 grams of tertiary dodecyl mercaptan and 1.2 grams of potassium persulfate.

The mixture was stirred under nitrogen for a period of about 6 hours at 70° C. The final conversion of monomer to polymer was 97 percent.

The emulsion polymer obtained was coagulated with 5 percent aqueous calcium chloride solution at 90° C. The coagulated terpolymer was then collected on a filter, washed with water and then dried in a vacuum oven at 70° C. for 18 hours.

The dried product's melt flow at 230° C. under 3.8 kg. load was measured to be 8.37 grams/10 minutes. The dried product was then compression molded at about 205° C. to give a clear plaque which after annealing for 16 hours at 105° C. gave a heat distortion temperature of 125° C. (257° F.) at 264 psi. The data for melt flow, heat deflection temperature, and haze values for this material are shown for Sample A in the Table below.

A similar procedure was followed to produce a terpolymer having a final composition of 25 weight percent α-methylstyrene, 73 weight percent methyl methacrylate and 2 weight percent of N-vinyl-2-pyrrolidone. The results of the testing for the plaques on this terpolymer are shown for Sample B in the Table below.

A control polymerization experiment to produce 25 weight percent of α-methylstyrene and 75 weight percent of methyl methacrylate was carried out using essentially the same method described above for producing the terpolymer.

The coagulated and dried copolymer had a melt flow of only 1.13 at 230° C. under 3.8 kg. load. The clear plaque, compression molded at 205° C., had an annealed heat distortion temperature of 124° C. at 264 psi. The results of the testing performed on this particular copolymer is shown for Sample C in the Table below.

|  | SAMPLES | | |
| --- | --- | --- | --- |
|  | A | B | C |
| Component (Weight Percent) | | | |
| α-methylstyrene | 25 | 25 | 25 |
| methyl methacrylate | 70 | 73 | 75 |
| N-vinyl-2-pyrrolidone | 5 | 2 | — |
| Melt Flow[1] | | | |
| 1.2 kg. load | 1.50 | 0.57 | 0.29 |
| 3.8 kg. load | 8.37 | 2.13 | 1.13 |
| Heat Deflection Temperature | 125 | 128 | 124 |
| ° C. (° F.)[2] | (257) | (261) | (255) |
| Haze[3] (Percent) | 3.9 | 3.1 | 4.0 |

[1]Melt flow at 230° C. using ASTM D-1238
[2]Heat deflection temperature at 264 psi load annealed 16 hours at 105° C.
[3]Haze determined using ASTM D-1003

While in the foregoing specification certain embodiments and examples of this invention have been described in detail, it will be appreciated that modifications and variations therefrom will be apparent to those skilled in this art. Accordingly, this invention is to be limited only by the scope of the appended claims.

I claim:

1. A transparent, high heat thermoplastic molding composition having improved melt flow characteristics, comprising a terpolymer having a weight ratio of from about 20 to 50 parts α-methylstyrene, about 79 to 40 parts methyl methacrylate, and about 1 to 10 parts N-vinyl-2-pyrrolidone.

2. The thermoplastic molding composition of claim 1 wherein the weight ratio of α-methylstyrene to methyl methacrylate to N-vinyl-2-pyrrolidone in said terpolymer is from about 20-30:73-67:3-6, respectively.

3. The thermoplastic molding composition of claim 1 wherein said terpolymer comprises about 25 parts α-methylstyrene, 70 parts methyl methacrylate and 5 parts N-vinyl-2-pyrrolidone.

4. The thermoplastic molding composition of claim 1 wherein said terpolymer has a haze value according to ASTM D-1003 of less than about 10 percent, a heat deflection temperature under load according to ASTM D-648-72 of greater than about 120° C. and melt flows at 230° C. according to ASTM D-1238 under 1.2 kg. and 3.8 kg. loads of greater than about 1 and 8 grams per 10 minutes respectively.

5. A thermoplastic molding composition possessing transparency, high melt flow and high heat deflection temperatures comprising a terpolymer having a weight ratio of from about 20 to 30 parts α-methylstyrene, 73 to 67 parts methyl methacrylate, and about 3 to 6 parts N-vinyl-2-pyrrolidone, said composition possessing a haze value according to ASTM D-1003 of less than about 10 percent, a heat deflection temperature under load according to ASTM D-648-72 of greater than about 120° C. and melt flow values at 230° C. according to ASTM D-1238-65T under 1.2 kg. and 3.8 kg. loads of greater than about 0.5 and 2.0 grams per 10 minutes respectively.

6. The composition of claim 5 wherein said terpolymer contains about 25 parts α-methylstyrene, about 70 parts methyl methacrylate, and about 5 parts N-vinyl-2-pyrrolidone and possesses melt flow values under said 1.2 and 3.8 kg. loads of greater than 1 and 8 grams per 10 minutes respectively.

* * * * *

UNITED STATES PATENT AND TRADEMARK OFFICE
CERTIFICATE OF CORRECTION

PATENT NO. : 4,086,410
DATED : April 25, 1978
INVENTOR(S) : Il H. Song

It is certified that error appears in the above—identified patent and that said Letters Patent are hereby corrected as shown below:

Column 2, line 44, "275°F." should read --257°F.--

Signed and Sealed this

Twenty-third Day of January 1979

[SEAL]

Attest:

RUTH C. MASON
Attesting Officer

DONALD W. BANNER
Commissioner of Patents and Trademarks